United States Patent
Westfield et al.

(10) Patent No.: US 12,152,912 B2
(45) Date of Patent: Nov. 26, 2024

(54) WIRELESS PROCESS VARIABLE TRANSMITTER WITH BATTERY POWER SOURCE

(71) Applicant: Rosemount Inc., Shakopee, MN (US)

(72) Inventors: Brian Lee Westfield, Victoria, MN (US); Theodore Henry Schnaare, Carver, MN (US); Cory Michael Robinson, Mayer, MN (US); Nicholas Aaron Wienhold, Waconia, MN (US)

(73) Assignee: Rosemount Inc., Shakopee, MN (US)

( * ) Notice: Subject to any disclaimer, the term of this patent is extended or adjusted under 35 U.S.C. 154(b) by 519 days.

(21) Appl. No.: 17/486,112

(22) Filed: Sep. 27, 2021

(65) Prior Publication Data

US 2023/0098203 A1 Mar. 30, 2023

(51) Int. Cl.
*G01D 21/02* (2006.01)
*H01M 6/50* (2006.01)
(Continued)

(52) U.S. Cl.
CPC .......... *G01D 21/02* (2013.01); *H01M 6/5044* (2013.01); *H02J 1/00* (2013.01); *H02J 7/0013* (2013.01); *H02J 13/00022* (2020.01)

(58) Field of Classification Search
CPC ............... G01D 21/02; H01M 6/5044; H01M 2220/10; H01M 10/425; H01M 10/441;
(Continued)

(56) References Cited

U.S. PATENT DOCUMENTS 6,680,690 B1  1/2004  Nilsson et al.
6,925,419 B2  8/2005  Duren et al.
(Continued)

FOREIGN PATENT DOCUMENTS

CA   2643684 A1 * 4/2010 ............... H02J 1/10
CN   1785699 A     6/2006
(Continued)

OTHER PUBLICATIONS

Communication pursuant to Rules 161(1) and 162 EPC from European patent application Serial No. 10784890.5, dated Aug. 22, 2012.
(Continued)

*Primary Examiner* — Shon G Foley
(74) *Attorney, Agent, or Firm* — Westman, Champlin & Koehler, P.A.

(57) ABSTRACT

A wireless process variable transmitter for use in an industrial process includes a process variable sensor configured to sense a process variable of the industrial process and provide a process variable sensor output. A battery power source includes a plurality of battery power banks each having a primary cell battery, a low voltage cut-off circuit electrically connected to the primary cell battery which provides an electrical connection to the primary cell battery while a voltage of the primary cell battery is above a threshold, and an ideal diode having an input electrically connected to the primary cell battery through the low voltage cut-off and providing a power bank output. A power sharing node has an input connected to the battery power bank output of each of the plurality of battery power banks and having a shared power output which provides power to circuitry of the wireless process variable transmitter.

21 Claims, 3 Drawing Sheets

(51) Int. Cl.
  *H02J 1/00* (2006.01)
  *H02J 7/00* (2006.01)
  *H02J 13/00* (2006.01)

(58) Field of Classification Search
  CPC ...... H02J 1/00; H02J 7/0013; H02J 13/00022; H02J 1/108; H02J 7/34; H02H 3/24; H02H 9/008; H04Q 2209/40; H04Q 2209/43; H04Q 2209/88; H04Q 9/00
  See application file for complete search history.

(56) References Cited

U.S. PATENT DOCUMENTS

| | | | |
|---|---|---|---|
| 7,586,292 | B1 | 9/2009 | Wakefield et al. |
| 8,852,775 | B2 | 10/2014 | McGuire et al. |
| 9,040,181 | B2 | 5/2015 | McGuire |
| 9,520,599 | B2 | 12/2016 | McGuire |
| 2003/0171827 | A1 | 9/2003 | Keyes et al. |
| 2005/0245291 | A1 | 11/2005 | Brown et al. |
| 2007/0201192 | A1 | 8/2007 | McGuire et al. |
| 2007/0285224 | A1 | 12/2007 | Karschnia et al. |
| 2008/0274772 | A1 | 11/2008 | Nelson et al. |
| 2008/0280568 | A1 | 11/2008 | Kielb et al. |
| 2008/0310195 | A1 | 12/2008 | Seberger et al. |
| 2009/0015216 | A1 | 1/2009 | Seberger et al. |
| 2009/0207770 | A1 | 8/2009 | Fayfield et al. |
| 2010/0123591 | A1 | 5/2010 | Bauschke et al. |

FOREIGN PATENT DOCUMENTS

| | | |
|---|---|---|
| JP | 2009-527889 A | 7/2009 |
| WO | 2007/098222 A2 | 8/2007 |

OTHER PUBLICATIONS

Examination report under sections 12 & 13 from Indian patent application Serial No. 4147/CHENP/2012, dated Aug. 9, 2017.
Summons to attend Oral Proceedings from European Patent Application No. EP 10784890.5, dated Jul. 20, 2015.
Notice of Allowance from U.S. Appl. No. 14/709,797, dated Aug. 12, 2016.
Notification of Transmittal of the International Search Report and the Written Opinion from the International Searching Authority for Application No. PCT/US2010/054229, dated Feb. 16, 2011.
Notice of Allowance from U.S. Appl. No. 14/709,797, dated Aug. 12, 2016.Office Action from Chinese patent application Serial No. 2010800134114, dated Aug. 22, 2012.
Office Action from Chinese patent application Serial No. 2010800134114, dated Apr. 1, 2013.
Office Action from Russian patent application Serial No. 2012134461.7, dated Oct. 23, 2013.
Office Action from Canadian patent application Serial No. 2,786,582, dated May 31, 2013.
Office Action from Japanese patent application Serial No. 2012-544501, dated Jan. 7, 2014.
Office Action from Russian patent application Serial No. 2012134461.7, dated Feb. 6, 2014.
Office Action from Russian patent application Serial No. 2012134461.7, dated Aug. 8, 2014.
Office Action from European patent application Serial No. 10784890.5, dated Jun. 16, 2014.
Office Action from Japanese patent application Serial No. 2012-544501, dated Nov. 11, 2014.
Office Action from U.S. Appl. No. 12/900,659, dated Jul. 2, 2013.
Office Action from U.S. Appl. No. 12/900,659, dated Oct. 27, 2014.
Office Action from U.S. Appl. No. 12/900,659, dated May 2, 2014.
Office Action from U.S. Appl. No. 12/900,659, dated Dec. 24, 2013.
Advisory Action from U.S. Appl. No. 12/900,659, dated Mar. 5, 2014.
Requirement for Restriction/Election from U.S. Appl. No. 12/900,659, dated May 8, 2013.
Notice of Allowance from U.S. Appl. No. 12/900,659, dated Jan. 23, 2015.
Notification of Transmittal of the International Search Report and the Written Opinion from the International Searching Authority for Application No. PCT/US2022/030009, dated Sep. 21, 2022.
Communication Pursuant to Rules 161(1) and 162 EPC from European Patent Application No. 22732728.5, dated Mar. 7, 2024, 3pgs.

* cited by examiner

WIRELESS PROCESS VARIABLE TRANSMITTER WITH BATTERY POWER SOURCE

BACKGROUND

The present invention relates to process variable transmitters of the type used to sense process variables in an industrial process. More specifically, the present invention relates to battery powered wireless process variable transmitters.

In industrial settings, control systems are used to monitor and control inventories of industrial and chemical processes, and the like. Typically, the control system performs these functions using a number of field devices distributed at key locations in the industrial process. Field devices may operate in a variety of different installations. Examples of process installations include petroleum, pharmaceutical, chemical, pulp and other processing installations. These field devices are communicatively coupled to control circuitry in a control room.

Field devices are used by the process control measurement industry for a variety of purposes. Usually, such devices have a field-hardened enclosure so that they can be installed outdoors in relatively rugged environments and be able to withstand climatological extremes of temperature, humidity, vibration and mechanical shock. Field devices also typically operate on relatively low power. For example, some field devices are currently available that receive all of their operating power from a known 4-20 mA loop.

Traditionally, field devices have been coupled to the process communication system (such as a control room) by virtue of physical conductors. Such wired connections have not only provided power to the field devices, but have also provided a route for communication. One limitation with wired field devices is that installation can sometimes be labor intensive since wires must be run to each physical location of a field device.

More recently, field devices have emerged that employ wireless communication to communicate with the control room and/or other suitable devices. These wireless field devices are generally provided with an internal power source, such as a battery, that can provide operating power for the wireless field device for a period of years.

The use of wireless technology in the industrial process industry has created a need for a way to locally power wireless transmitters. Batteries are one way that local power can be provided. However, one problem with batteries is that their capacity is limited. There is generally a tradeoff between battery capacity and longer transmitter life and/or higher update rates or heavy load due to network configuration. Therefore, it is desirable that field device power be provided in such a way that larger-capacity batteries can be used.

SUMMARY

A wireless process variable transmitter for use in an industrial process includes a process variable sensor configured to sense a process variable of the industrial process and provide a process variable sensor output. Measurement circuitry coupled to the process variable sensor provides an output related to the process variable sensor output. Wireless communication circuitry coupled to the measurement circuitry is configured to wirelessly communicate information related to the process variable sensor output to a remote location. A battery power source includes a plurality of battery power banks each having a primary cell battery, a low voltage cut-off circuit electrically connected to the primary cell battery which provides an electrical connection to the primary cell battery while a voltage of the primary cell battery is above a threshold, and an ideal diode having an input electrically connected to the primary cell battery through the low voltage cut-off and providing a power bank output. A power sharing node has an input connected to the battery power bank output of each of the plurality of battery power banks and having a shared power output which provides an electrical current from each primary cell battery in the plurality of battery power banks. A power supply circuit is electrically connected to the shared power output configured to provide power to the measurement circuitry and the wireless communication circuitry using power shared between each primary cell battery in the plurality of power banks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
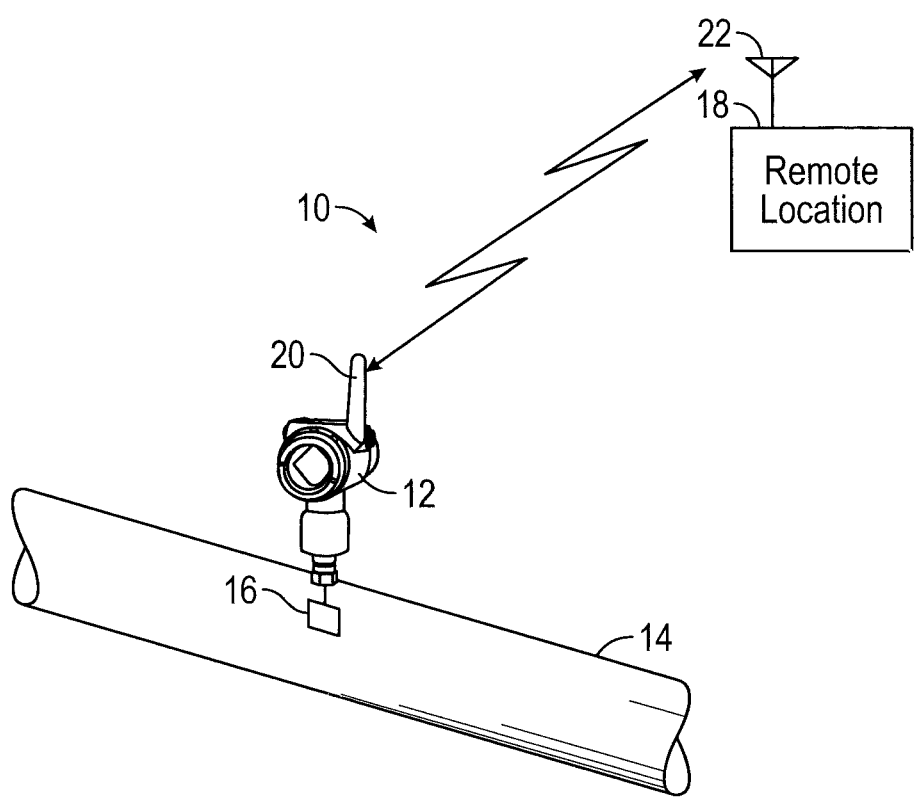
FIG. 1 is a diagram showing an industrial process including a wireless process variable transmitter.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

There is an increasing demand in the industrial process control industry for battery operated industrial field devices, and specifically process variable transmitters, to deliver additional functionality and at faster update rates. Addressing this demand comes at the expense of reduced battery life and more frequent battery changes by the operator. While battery technology continues to improve, the technology is not keeping pace with industry needs. In order to deliver field devices that meet the needs of the industry a new power management solution is required.

As discussed in the Background section, there are some types of process variable transmitters which operate wirelessly. For such transmitters it is desirable to include an internal power source such as a battery. For some installations, primary cell batteries (batteries which cannot be recharged) offer advantages over secondary cell (rechargeable) batteries. These advantages include reduced cost and increased power storage capacity. The greater the amount of power available to a process variable transmitter, the greater the functionality that it can provide. This includes increased data computation and diagnostics, increased output signal strength and increased update rates.

One particularly promising primary cell battery is a lithium thionyl chloride primary cell battery because of their high energy storage capacity. Some primary cells are difficult to connect in parallel to obtain higher capacity. However, lithium thionyl chloride primary cells are particularly problematic when connected in parallel because a weaker battery in the parallel connection will be charged by the other batteries. This creates an unstable operating condition which may result in thermal runaway.

The present invention includes an industrial wireless process variable transmitter with a power bank configuration which includes a primary cell battery which is configured for parallel connection. In one specific configuration, the power bank includes at least one of a primary cell battery, a low voltage cut-off circuit, an energy limiter and an ideal diode. The circuitry allows for a safe and efficient means of using energy from multiple primary cell batteries connected in parallel.

FIG. 1 is a simplified diagram of an industrial process 10 including a wireless process variable transmitter (field device) 12 arranged to sense a process variable of a process fluid in process piping 14 using a process variable sensor 16. However, the invention is applicable to process variable transmitters which sense other types of process variables. The wireless process variable transmitter 12 communicates to a remote location 18 using communication circuitry (not shown in FIG. 1) and a wireless radio frequency signal communicated between antennas 20 and 22. During operation the process variable transmitter 12 senses a process variable of the process fluid in pipe 14 using process variable sensor 16. Process variable sensor 16 may be any type of process variable and examples include sensors to sense pressure, flow rate, differential pressure, corrosion, gas concentration, level, temperature, pH, turbidity, location information, acoustic data, or others. The process variable transmitter 12 uses internal circuitry (not shown in FIG. 1) to obtain measurement data related to the sensed process variable. The process variable transmitter 12 then communicates data related to the sensed process variable to the remote location 18 using the wireless connection between antennas 20 and 22. The communication may also include other information including raw data, diagnostic information, other sensed process variables, data related to the environment, time information, information which identifies the particular process variable transmitter 12 such as an address, etc. Further, the remote location 18 can also communicate information to the process variable transmitter 12. Such communication can include process variables sensed by other devices, commands, programming instructions, among others. The communication may be direct or through intermediary connections such as a mesh network, for example.

Figure 2:
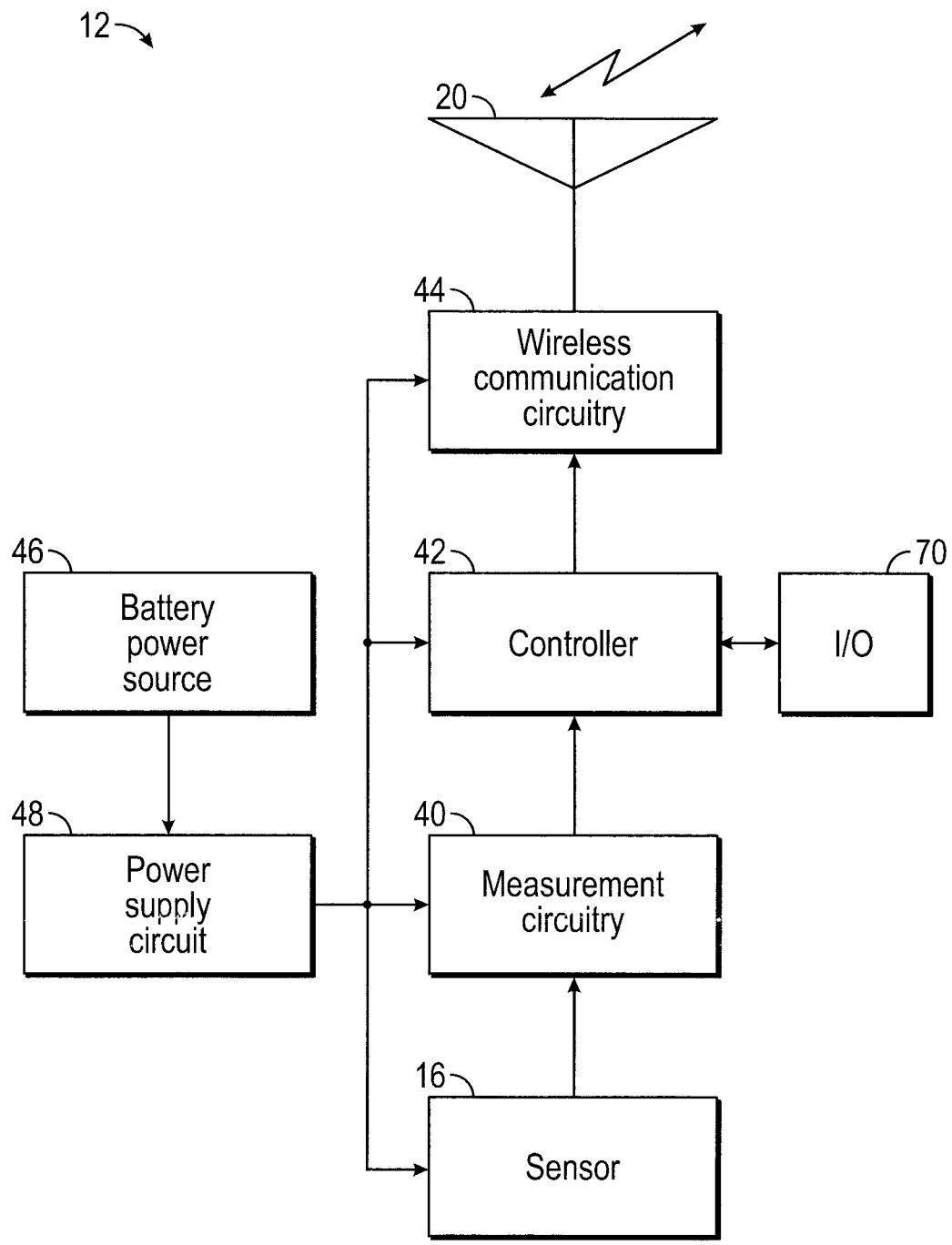
FIG. 2 is a simplified block diagram of the wireless process variable transmitter of FIG. 1.

FIG. 2 is a simplified block diagram of the wireless process variable transmitter 12 including measurement circuitry 40 connected to the process variable sensor 16. Measurement circuitry 40 is configured to perform initial processing on a sensor output from the process variable sensor 16 and provide an output to controller 42. Controller 42 may comprise for example, a digital controller such as a microprocessor and measurement circuitry 40 can include an analog to digital converter to provide a digital output related to the sensed process variable. Controller 42 controls wireless communication circuitry 44 to provide a wireless radio frequency output using antenna 20 which is related to the sensed process variable. Example process variables sensors 16 include corrosion sensors arranged to measure a rate of corrosion of process components, a pressure sensor configured to measure a pressure of a process fluid, a temperature sensor configured to measure a temperature of industrial process, an acoustic sensor which measures sound and vibration in an industrial process, a gas sensor which measures concentration of a gas in an industrial process, a level sensor configured to measure a level of a process fluid for example containing in a tank, a location tracking sensor arranged to monitor a location of process components or personnel, etc.

Figure 3:
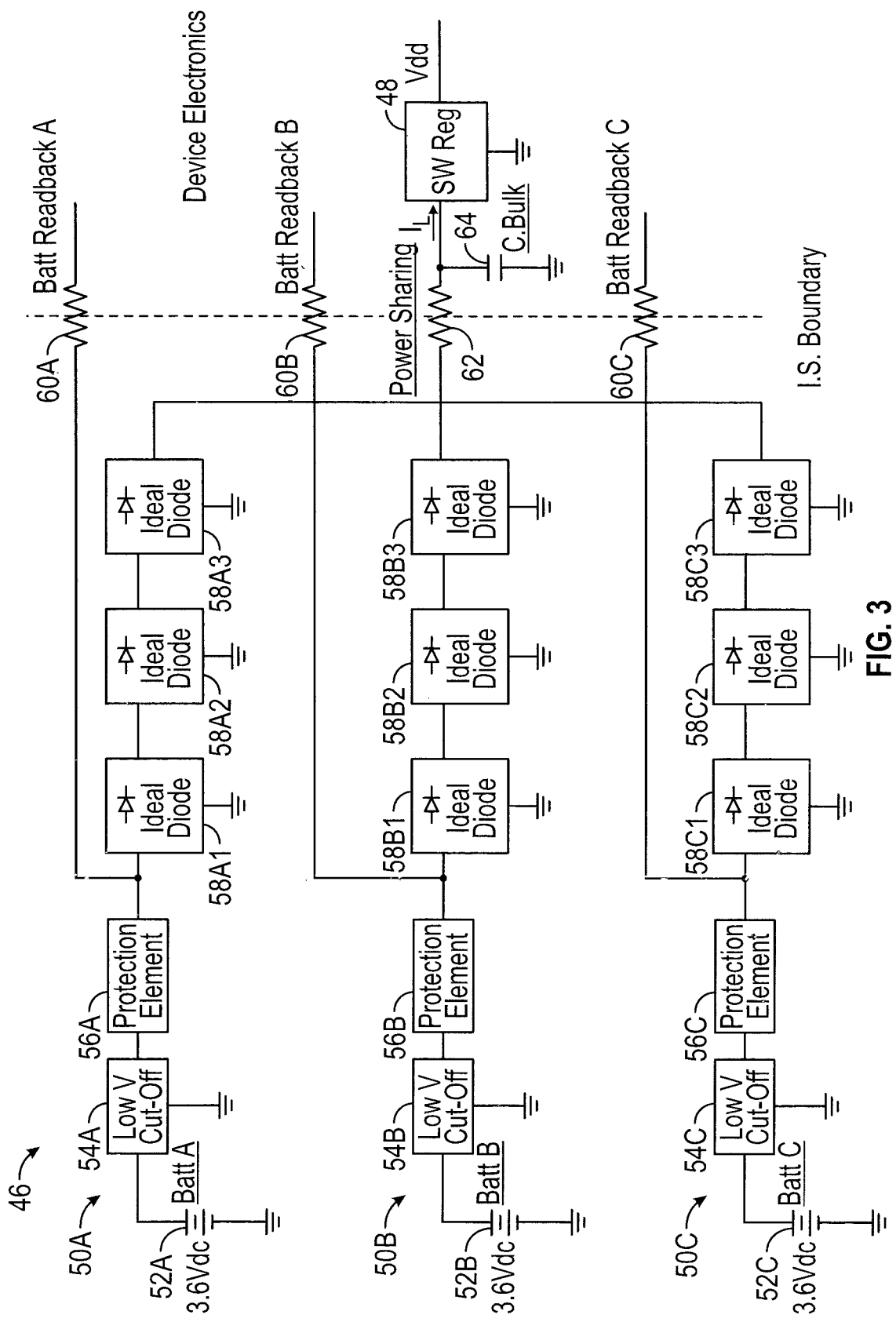
FIG. 3 is a simplified block diagram of a plurality of power banks in a battery power source of FIG. 2.

FIG. 2 also illustrates a battery power source 46 which includes a plurality of power banks 50 shown in FIG. 3. Battery power source 46 provides a battery power output to power supply circuitry 48 which in turn provides power to measurement circuitry 40, controller 42 and wireless communication circuitry 44. In some configurations, power is also provided to process variable sensor 16.

The wireless communication through circuitry 44 can occur in accordance with any appropriate communication technique. A number of standards are used and these include WirelessHART® (IEC 62591) or ISA 100.11a (IEC 62734), or another wireless communication protocol, such as WiFi, LoRa, Sigfox, BLE, or any other suitable protocol including a custom or proprietary communication protocol.

FIG. 3 is a simplified schematic diagram of the battery power source 46 including a plurality of battery power banks 50A, 50B and 50C. The configuration illustrated in FIG. 3 provides a self managing power distribution circuit which provides a means of extending the operating life of the field device 12 by using multiple batteries. The embodiment shows the use of three battery banks 50A, 50B and 50C. However, any number of banks may be employed.

The use of lithium thionyl chloride primary cell batteries is desirable because of their high energy capacity. However, unlike typical battery technologies, lithium thionyl chloride primary cell batteries cannot be placed directly in parallel as a means of increasing their capacity. If lithium thionyl chloride primary cell batteries are connected in parallel, the weaker battery of the group will be charged by the other batteries. This can create an unstable operating condition and result in a thermal runaway condition. The configuration illustrated in FIG. 3 allows for a safe and efficient means for using energy from multiple batteries.

Pursuant to this embodiment, the battery power source 46 includes three separate battery power banks 50A, 50B and 50C. In this configuration each power bank is identical to the other. Each power bank includes a primary cell battery 52A, 52B and 52C connected to a low voltage cut-off circuit 54A, 54B and 54C, respectively. The output from the low voltage cut-off is coupled to a protection element 56A, 56B and 56C, respectively, which in turn connects to a series of ideal diodes. Each battery power bank 50A, 50B and 50C preferably includes three ideal diodes as illustrated in FIG. 3 58A1, 2, 3, 58B1, 2, 3 and 58C1, 2, 3, respectively. The use of three diodes allows the unit to meet intrinsic safety requirements for redundancy. The ideal diodes may operate in accordance with any ideal diode technology. In one specific embodiment, the ideal diode comprises active circuitry.

The outputs from power banks 50A, B and C are coupled to a power sharing resistor 62 which acts as a power sharing node and provides power to a power supply circuit 48 which is configured as a switching regulator. A bulk capacitor 64 operates to filter and smooth any voltage variations in the power sharing node 62.

Battery read back outputs are provided through resistors 60A, 60B and 60C which couple to the outputs from the protective elements 56A, 56B and 56C, respectively. The connections through resistor 60A, 60B and 60C are coupled to controller 42 and can be used to monitor the voltage of each battery 52A, 52B and 52C, respectively. The resistors 60A,B,C and 62 provide an intrinsic safety boundary which prevents excessive power from the batteries 52A,B,C from entering the device electronics.

In general, each bank 50A-C is identical to the other. The output of each bank 50A-C is made common at the power sharing resistor 62 to deliver power to the device 12. The low voltage cut-off circuit 54A-C is used to disconnect the battery 52A-C from the circuit when it becomes nearly depleted. This ensures a battery 52A-C is never fully depleted and can be safely transported during recycling.

Protective elements 56A-C limit the total energy into the circuitry to the energy rating of downstream components. Elements 56A-C in conjunction with the power sharing resistor 62 make the circuit intrinsically safe for use in hazardous locations. The use of triple redundant ideal diode circuits 58 is a feature in the design. The diodes 58 provide four primary functions. They allow battery discharge current to flow into the load. Further, they block any reverse current from charging the battery 52. They also provide intrinsic safety and limit the voltage loss in each bank 50A-C. Maximum energy transfer between battery and load occurs when voltage losses in each bank are kept small. Using ideal diodes limits the voltage losses to less than 50 mv compared to a one volt drop when using conventional Schottky diodes. This may result in more than a 60% improvement in battery life.

During normal operation, all three battery banks 50A, 50B and 50C work in conjunction with one another to supply current $I_L$ to the load. Initially, the load will be solely powered by the battery bank 50A-C with the highest voltage. As the voltage on that bank decays, the bank with the next closest voltage will begin to share the load. Eventually, all three banks 50A-C will provide current to the load. Periodically, the voltage of each battery bank is read by the controller 42 using battery read back connections A-C. This allows the device 12 to report the health of each battery 52A-C to the remote location 18. A low battery warning can be issued to an operator so the depleted battery can be replaced. For example, controller 42 can issue an alert using wireless communication circuitry 44 transmitted to remote location 18 that indicates one or more of the batteries 52A-C has a low voltage and should be replaced. A local warning can also be provided by I/O 70.

This self-managing power distribution circuit 46 offers several advantages over those that switch in one battery at a time once they are depleted. For example, batteries that sit for long periods of time without a load tend to form a passivation layer. This layer acts as a series resistive element and inhibits the battery from delivering load current and dips battery voltage for an extended period of time when first put in use. This self-managing technique prevents passivation by continuously duty cycling load to each battery as part of its load sharing concept. The concept is scalable by allowing any number of battery banks 50 to be added to achieve desired capacity. Even in a multi-bank system, fewer batteries could be installed to operate the device if desired. This concept also allows for hot swapping of batteries as the other one or two batteries continue to power the load without interruption. Another advantage of this concept is it eliminates the complexity of having to determine when an old battery should be switched out and a new battery switched in. The self-managed switching between battery banks 50 provided by the nvention along with the continuous health monitoring eliminates these issues.

In one embodiment, transmitter 12 includes additional input/output circuitry 70 which can provide additional functionality. For example, I/O circuitry 70 can provide local indicators such as LED's, LCD's or other such interface devices that tell a user the current state of each battery 52. Another means of communicating this information is through a digital or analog communication connection to the remote location 18. I/O 70 can also be used to provide information to the controller 42 such as an indication that one of the batteries 52 has been replaced. 110 circuitry 70 can be a manual local input and/or can provide local communication such as via Bluetooth or WiFi, etc.

Although the present invention has been described with reference to preferred embodiments, workers skilled in the art will recognize that changes may be made in form and detail without departing from the spirit and scope of the invention.

What is claimed is:

1. A wireless process variable transmitter for use in an industrial process, comprising:
   a process variable sensor configured to sense a process variable of the industrial process and provide a process variable sensor output;
   measurement circuitry coupled to the process variable sensor configured to provide an output related to the process variable sensor output;
   wireless communication circuitry coupled to the measurement circuitry configured to wirelessly communicate information related to the process variable sensor output to a remote location;
   a battery power source comprising a plurality of battery power banks each comprising:
      a primary cell battery;
      a low voltage cut-off circuit electrically connected to the primary cell battery which provides an electrical connection to the primary cell battery while a voltage of the primary cell battery is above a threshold;
      an ideal diode having an input electrically connected to the primary cell battery through the low voltage cut-off and providing a power bank output;
   a power sharing node having an input connected to the battery power bank output of each of the plurality of battery power banks and having a shared power output comprising an electrical current from at least one primary cell battery in the plurality of battery power banks;
   a power supply circuit electrically connected to the shared power output configured to provide power to the measurement circuitry and the wireless communication circuitry using power from at least one primary cell battery in the plurality of power banks; and
   wherein each of the plurality of power banks includes at least three ideal diodes connected in series to thereby provide intrinsic safety.

2. The wireless process variable transmitter of claim 1 wherein each of the plurality of the plurality of battery power banks includes an energy limiter electrically connected to the primary cell battery configured to limit an amount of energy delivered by the primary cell battery.

3. The wireless process variable transmitter of claim 1 wherein the power supply circuit is powered by a primary cell battery in the plurality of power banks having a highest voltage level.

4. The wireless process variable transmitter of claim 1 wherein the power sharing node comprises a resistor.

5. The wireless process variable transmitter of claim 1 wherein the process variable sensor comprises at least one of a pressure sensor, flow sensor, corrosion sensor, gas concentration sensor, level sensor, temperature sensor, pH sensor, turbidity sensor, location sensor and acoustic sensor.

6. The wireless process variable transmitter of claim 1 wherein the power supply circuit provides power to the process variable sensor.

7. The wireless process variable transmitter of claim 1 including a plurality of battery read back connections each coupled to one of the plurality of battery power banks configured to provide a voltage related to a voltage of a battery from a respective power bank.

8. The wireless process variable transmitter of claim 7 wherein the plurality of battery read back connections couple to a controller.

9. The wireless process variable transmitter of claim 7 including an output provided based upon a voltage on a battery read back connection indicating a low battery.

10. The wireless process variable transmitter of claim 9 wherein the output is provided remotely.

11. The wireless process variable transmitter of claim 9 wherein the output is provided locally.

12. The wireless process variable transmitter of claim 7 wherein the plurality of battery read back connections include a series resistor.

13. The wireless process variable transmitter of claim 12 wherein the series resistors provides an intrinsic safety boundary.

14. The wireless process variable transmitter of claim 1 wherein the power sharing node provides an intrinsic safety boundary.

15. The wireless process variable transmitter of claim 1 wherein the power supply circuit comprises a switching regulator.

16. The wireless process variable transmitter of claim 1 wherein one of the primary cell batteries in the plurality of battery power banks can be disconnected without interrupting the shared power output from the power sharing node.

17. The wireless process variable transmitter of claim 1 wherein the ideal diodes in the plurality of battery power banks block current from flowing into a primary cell battery.

18. The wireless process variable transmitter of claim 1 including a bulk capacitor connected to the shared power output.

19. The wireless process variable transmitter of claim 1 wherein the plurality of battery power banks reduce self passivation of the primary cell batteries.

20. The wireless process variable transmitter of claim 1 wherein the primary cell batteries comprise lithium thionyl chloride primary cell batteries.

21. A wireless process variable transmitter for use in an industrial process, comprising:
a process variable sensor configured to sense a process variable of the industrial process and provide a process variable sensor output;
measurement circuitry coupled to the process variable sensor configured to provide an output related to the process variable sensor output;
wireless communication circuitry coupled to the measurement circuitry configured to wirelessly communicate information related to the process variable sensor output to a remote location;
a battery power source comprising a plurality of battery power banks each comprising:
a primary cell battery;
a low voltage cut-off circuit electrically connected to the primary cell battery which provides an electrical connection to the primary cell battery while a voltage of the primary cell battery is above a threshold;
an ideal diode having an input electrically connected to the primary cell battery through the low voltage cut-off and providing a power bank output;
a power sharing node having an input connected to the battery power bank output of each of the plurality of battery power banks and having a shared power output comprising an electrical current from at least one primary cell battery in the plurality of battery power banks;
a power supply circuit electrically connected to the shared power output configured to provide power to the measurement circuitry and the wireless communication circuitry using power from at least one primary cell battery in the plurality of power banks; and
a plurality of battery read back connections each coupled to one of the plurality of battery power banks configured to provide a voltage related to a voltage of a battery from a respective power bank, wherein the plurality of battery read back connections include a series resistor.

* * * * *